(12) United States Patent
Isernhagen et al.

(10) Patent No.: US 12,535,436 B2
(45) Date of Patent: Jan. 27, 2026

(54) METHOD, DEVICES AND ARRANGEMENTS FOR LOCATING BONY PARTS PRESENT IN A POULTRY LEG

(71) Applicant: FPI FOOD PROCESSING INNOVATION GMBH & CO. KG, Lübeck (DE)

(72) Inventors: Christoph Fabian Isernhagen, Lübeck (DE); Oliver Schlesiger, Lübeck (DE); Florian Jarck, Lübeck (DE)

(73) Assignee: FPI Food Processing Innovation GmbH & Co. KG, Lübeck (DE)

( * ) Notice: Subject to any disclaimer, the term of this patent is extended or adjusted under 35 U.S.C. 154(b) by 188 days.

(21) Appl. No.: 18/580,898

(22) PCT Filed: Jul. 26, 2021

(86) PCT No.: PCT/EP2021/070826
§ 371 (c)(1),
(2) Date: Jan. 19, 2024

(87) PCT Pub. No.: WO2023/006173
PCT Pub. Date: Feb. 2, 2023

(65) Prior Publication Data
US 2025/0052699 A1   Feb. 13, 2025

(51) Int. Cl.
*G01N 23/04*   (2018.01)
*G01N 23/083*   (2018.01)
(Continued)

(52) U.S. Cl.
CPC ........... *G01N 23/04* (2013.01); *G01N 23/083* (2013.01); *G01N 33/12* (2013.01); *G06V 10/774* (2022.01);
(Continued)

(58) Field of Classification Search
CPC ...... G01N 23/04; G01N 23/083; G01N 33/12; G01N 2223/401; G01N 2223/618;
(Continued)

(56) References Cited

U.S. PATENT DOCUMENTS

2020/0345043 A1\* 11/2020 Blaine .................... A23B 2/503
2021/0204553 A1   7/2021 Mehta et al.

FOREIGN PATENT DOCUMENTS

CN   109637633 A   4/2019
CN   110503635 A   11/2019
(Continued)

OTHER PUBLICATIONS

CN First Office Action dated Jun. 14, 2025 pertaining to CN application No. 202180100355.6 filed Jul. 26, 2021, pp. 1-6.
(Continued)

*Primary Examiner* — Courtney D Thomas
(74) *Attorney, Agent, or Firm* — Dinsmore & Shohl LLP (57) ABSTRACT

A method, arrangement and apparatus are provided for training at least one neural network for locating bony parts present in a poultry leg. The method includes the steps: conveying the poultry legs in a conveying direction by a conveying device; acquiring digital images of the front side or back side of each of the poultry legs conveyed past the imaging system by a first optical imaging system; sequentially providing the digital images as input data to a first neural network configured for locating the bony parts, wherein the first neural network for locating the bony parts has been trained by a described method; and determining position data of the bony parts by the first neural network; and providing the position data, for display and/or transmission, to a downstream machine for processing the poultry legs on the basis of the determined position data.

34 Claims, 7 Drawing Sheets

(51) Int. Cl.
*G01N 33/12* (2006.01)
*G06V 10/774* (2022.01)
*G06V 10/82* (2022.01)
*G06V 40/10* (2022.01)

(52) U.S. Cl.
CPC .............. *G06V 10/82* (2022.01); *G06V 40/10* (2022.01); *G01N 2223/401* (2013.01); *G01N 2223/618* (2013.01)

(58) Field of Classification Search
CPC ...... G06V 10/774; G06V 10/82; G06V 40/10; A22B 5/0035; A22B 5/0041; A22B 5/007; A22C 17/0073; A22C 21/0069; A22C 17/004; G06N 20/00; G06T 7/00
See application file for complete search history.

(56) References Cited

FOREIGN PATENT DOCUMENTS

| | | |
|---|---|---|
| CN | 111062947 A | 4/2020 |
| CN | 112200780 A | 1/2021 |
| EP | 2532246 B1 | 7/2015 |
| WO | 2018022598 A1 | 2/2018 |
| WO | 2020218513 A1 | 10/2020 |

OTHER PUBLICATIONS

Ding, W. et al. "An adaptive extraction method of carpal feature region based on neural network" Journal of Zhejiang University of Technology, Oct. 9, 2020, pp. 562-569, vol. 48, No. 5.
Guan, H. et al. "Design and Test of the Poultry Image Synchronous Acquisition System Based on Laser and X-ray" Journal of Agricultural Mechanization Research, Nov. 1, 2011, pp. 101-105, Issue 11.

* cited by examiner

METHOD, DEVICES AND ARRANGEMENTS FOR LOCATING BONY PARTS PRESENT IN A POULTRY LEG

CROSS-REFERENCE TO RELATED APPLICATIONS

This application is the U.S. National Stage of PCT/EP2021/070826 filed on Jul. 26, 2021, the entire content is incorporated herein by reference in its entirety.

FIELD OF THE INVENTION

The present invention relates to a method for training at least one neural network for locating bony parts present in a poultry leg, and to a non-volatile computer-readable storage medium comprising a program which comprises instructions for causing the computer to carry out the method. The invention relates further to a method for locating bony parts present in a poultry leg and to an arrangement for training at least one neural network for locating bony parts present in a poultry leg, and to an apparatus for locating bony parts present in a poultry leg.

BACKGROUND OF THE INVENTION

Such methods, arrangements and apparatuses are used in the automatic processing of poultry. In order to detach flesh parts from the bones or bony parts of the poultry legs, it is first necessary to determine the exact location of the bony parts in order to be able to optimally position the cuts required for deboning. In particular, the positions and/or location of thigh bones and lower leg bones and of the knee cap are of interest.

Document EP 2 532 246 B1 discloses a deboning method for meat with bone using an X-ray system. The poultry leg to be processed is transported through between an X-ray source and an X-ray detector, and the location and position of the bony parts are determined by analysing the acquired X-ray data.

It is a disadvantage that such known methods always necessitate the use of X-ray imaging during operation. This presents particular challenges in terms of working safety and is cost- and maintenance-intensive. Moreover, highly skilled trained personnel is required for handling X-rays.

Accordingly, it is the object of the present invention to provide corresponding methods, apparatuses and arrangements which allow bony parts in poultry legs to be located with high precision and with as little outlay in terms of apparatus as possible.

SUMMARY OF THE INVENTION

The object is achieved by the method mentioned hereinbefore for training at least one neural network for locating bony parts present in a poultry leg, comprising the steps: providing a plurality of poultry legs; recording images of the front sides or back sides of the poultry legs in the optically visible wavelength range by means of an optical camera in order to generate optical image data for each of the poultry legs; irradiating the back side or front side of the poultry legs with X-rays of an X-ray source and recording X-ray images on the side of the poultry legs that is remote from the X-ray source by means of an X-ray imaging system in order to generate X-ray image data for each of the poultry legs; defining reference points for marking the positions of the bony parts on the basis of the X-ray image data; overlaying the optical image data with the positions of the bony parts and/or the X-ray image data in order to generate hybrid image data for each of the poultry legs; defining reference points for marking the positions of the bony parts on the basis of the hybrid image data; inputting the image data of the optical camera as input data and the reference points as target data as training data for the neural network; repetitively adjusting the weights of the neural network on the basis of the difference between the target data and the output data generated by the neural network.

The method according to the invention has the advantage that X-ray imaging is used only in the training or learning phase. Once the neural network has been trained by the method according to the invention, the location of the bony parts in the poultry legs can reliably be determined solely on the basis of optical images of the poultry legs. For this purpose, the optical image data and the X-ray image data are overlaid with one another. The hybrid image data thus represent an overlay image which contains the optical image and the X-ray image of the intact poultry leg. It is therefore possible, on the basis of the hybrid image, to identify the exact location and position of the bony parts in the poultry leg and relate them to the external view of the intact poultry leg. In this manner, a correlation between the location of the bony parts and the external form of the poultry leg is established.

An expedient embodiment of the invention is characterised in that the reference points comprise thigh reference points, lower leg reference points and knee cap reference points. The above-mentioned reference points provide sufficient accuracy for determining the location and position of the thigh and lower leg bones and of the knee cap. At the same time, the algorithmic complexity for determining these reference points is reduced to a necessary minimum.

According to a further preferred embodiment of the invention, the thigh reference points and the lower leg reference points are pairs of points which in each case denote the position of the bone end areas. On the basis of the pairs of points, the position and orientation of the mentioned bones in the poultry leg is defined sufficiently accurately. Particularly preferably, the pairs of points in each case lie at the head of the bone, preferably in the middle of the bone head in question relative to the longitudinal direction of the bone.

A preferred further development of the invention is distinguished in that the knee cap reference points form a cloud of points comprising at least one point, wherein the points of the cloud of points reference edge positions of the knee cap. A cloud of points with one point is generally sufficient for indicating the location of the knee cap. Alternatively, this one point is so chosen that it lies in the middle of the knee cap.

A further expedient embodiment of the invention is characterised in that the cloud of points comprises at least an upper knee cap reference point and a lower knee cap reference point, wherein the upper and lower knee cap reference points are located in a knee cap edge area. By specifying the two mentioned reference points, it is possible not only to determine the position of the knee cap but also to estimate its size, in particular its length and width.

Particularly preferably, the cloud of points comprises a third reference point in addition to the mentioned upper knee cap reference point and the lower knee cap reference point, so that the three reference points form a triangle the area of which covers the knee cap as much as possible. The mentioned three reference points then preferably lie—as already mentioned—at the edge of the knee cap.

According to a further preferred embodiment, object-related image regions of the optical image data and the X-ray image data are extracted from the image background before the hybrid image data are generated. By means of the extraction, image regions that do not show the poultry leg, or the bony parts thereof, are masked. This prevents structures located in the background from being taken into account in the training of the neural network. Overall, the reliability and precision of the location of the bony parts is thus increased.

The object is also achieved by the non-volatile computer-readable storage medium mentioned hereinbefore, comprising a program which comprises instructions for causing the computer to carry out the method for training at least one neural network for locating bony parts present in a poultry leg.

The object is further achieved by the method mentioned hereinbefore for locating bony parts present in a poultry leg, comprising the steps: conveying the poultry legs in a conveying direction by means of a conveying device; acquiring digital images of the front sides or back sides of the poultry legs by means of a first optical imaging system for each of the poultry legs conveyed past the imaging system; sequentially providing the digital images as input data to a first neural network configured for locating the bony parts, wherein the first neural network for locating the bony parts has been trained by the above-mentioned method for training the at least one neural network; determining position data of the bony parts by means of the first neural network, and providing the position data, for display and/or transmission, to a downstream machine for processing the poultry legs on the basis of the determined position data.

The method according to the invention has the advantage that images of poultry legs only have to be acquired in the optically visible range in order to locate the bony parts present in the poultry legs. The method according to the invention is therefore free of X-ray imaging during operation. The required outlay in terms of apparatus is thus reduced considerably compared to the methods known from the prior art. In particular by dispensing with X-ray imaging, the risks associated with X-ray imaging are no longer present and the use of highly skilled personnel can be dispensed with. The method according to the invention is therefore considerably less expensive compared to the methods known from the prior art. However, it is in no way inferior to X-ray-based methods in terms of the precision of the location of the bony parts.

An expedient embodiment of the invention is characterised in that the reference points comprise thigh reference points, lower leg reference points and knee cap reference points. The above-mentioned reference points provide sufficient accuracy for determining the location and position of the thigh and lower leg bones and of the knee cap. At the same time, the algorithmic complexity for determining these reference points is reduced to a necessary minimum.

According to a further preferred embodiment of the invention, the thigh reference points and the lower leg reference points are pairs of points which in each case denote the position of the bone end areas. On the basis of the pairs of points, the position and orientation of the mentioned bones in the poultry leg is defined sufficiently accurately. Particularly preferably, the pairs of points in each case lie at the head of the bone.

A preferred further development of the invention is distinguished in that the knee cap reference points form a cloud of points comprising at least one point, wherein the points of the cloud of points reference edge positions of the knee cap. A cloud of points with one point is generally sufficient for indicating the location of the knee cap. Alternatively, this one point is so chosen that it lies in the middle of the knee cap.

A further expedient embodiment of the invention is characterised in that the cloud of points comprises at least an upper knee cap reference point and a lower knee cap reference point, wherein the upper and lower knee cap reference points are located in a knee cap edge area. By specifying the two mentioned reference points, it is possible to determine not only the position of the knee cap but also its size. Particularly preferably, the cloud of points comprises a third reference point in addition to the mentioned upper knee cap reference point and the lower knee cap reference point, so that the three reference points form a triangle the area of which covers the knee cap as much as possible. The mentioned three reference points then preferably lie—as already mentioned—at the edge of the knee cap.

A further expedient embodiment of the invention is characterised by determining, from the position data provided, a cutting line path of the located bony parts by means of a control unit of the downstream machine, and moving a knife, which is adapted to be controllably moved, of the downstream machine by means of the control unit along this cutting line path in order to debone the poultry leg. In this manner, the poultry leg can be optimally deboned. Knowledge of the location of the bony parts allows an optimal cutting line path to be determined, so that the flesh is detached from the bony parts but contact of the knife of the downstream machine with the bony parts of the poultry leg is avoided at all events. At the same time, however, knowledge of the position of the bony parts allows the cutting line to be brought as close as possible to the bony parts in order to leave as little residual flesh as possible on the bony parts. The position of the incision, which is generally in the region of the knee cap, can thus also be determined exactly. The present invention thus allows poultry legs to be deboned fully automatically.

A preferred further development of the invention is distinguished in that the acquired digital images of the poultry legs, before they are provided as input data to the first neural network, are fed to a leg-side detection device which is adapted to carry out a leg-side detection and to establish whether each particular digital image is of a right or a left poultry leg and, if the digital image does not match a specified leg side, to mirror the image data of the digital image in question at a virtual axis in order to convert the digital image of a right poultry leg into a virtual digital image of a left poultry leg and vice versa. Preferably, the virtual axis is a vertical axis. Advantageously, it is thus sufficient to design the first neural network so that it detects only one leg type, namely either a left or a right poultry leg. As a result, both the complexity of the neural network is reduced and the required outlay in terms of training the neural network is reduced significantly, since it has to be trained with only one poultry leg type. If the neural network is designed for the processing of left poultry legs, for example, digital images of right poultry legs are first mirrored as described. As a result of the mirroring, the partial image of the poultry leg then appears as though it had been taken of a left poultry leg. In this manner, the image data both of right and of left poultry legs can be used to locate the bony parts in poultry legs by means of the neural network designed for the processing of left poultry legs. If the neural network is designed for the processing of right poultry legs, the procedure is correspondingly carried out the other way round, and the partial images of left poultry legs are mirrored as described before being processed by the neural network.

A further expedient embodiment of the invention is characterised in that the leg-side detection is carried out by means of a second neural network which has been trained with images of poultry legs of the specified leg side. This has the advantage of very high detection accuracy. Preferably, the second neural network is trained in each case exclusively with images of left or right poultry legs. If the second neural network is designed for the detection of left poultry legs, for example, it indicates that no left leg has been detected when an image of a right poultry leg is inputted. The non-detection of a left poultry leg implies that the leg in question is a right leg.

A preferred further development of the invention is characterised in that the digital images of the poultry legs, before they are provided as input data to the first neural network and/or before the leg-side detection, are fed to a front-side and back-side detection device which is adapted to carry out a front-side and back-side detection and to establish whether each particular digital image shows the front side or the back side of the poultry leg and, if the digital image does not match a specified front side/back side, to cause a suspending receptacle of the conveying device, which suspending receptacle holds the poultry leg in question and is controllably pivotable about its vertical axis, to perform a 180° rotation, and to acquire a digital image of the side of the poultry leg facing the first optical imaging system by means of a second optical imaging system which is arranged downstream of the first optical imaging system relative to the conveying direction. This has the advantage that the poultry legs do not have to be pre-sorted in terms of their front side/back side orientation. The front side thereby refers to the outer side or skin side of the poultry leg, while the back side refers to the inner side or flesh side of the poultry leg. Location of the bony parts can therefore take place fully automatically regardless of the orientation of the poultry legs. Preferably, the front side of the poultry legs is always chosen as the specified side because, owing to its greater proportion of flesh and the resulting curved surface, it provides better points of reference in the digital images for the location of the bony parts.

A further expedient embodiment of the invention is characterised in that the front-side and back-side detection is carried out by means of a third neural network which has been trained with images of poultry legs of the specified front side/back side. This has the advantage of very high detection accuracy. Preferably, the third neural network is in each case trained exclusively with images of the front side or back side of poultry legs. If the third neural network is designed to detect poultry leg front sides, for example, it indicates that no front side has been detected when an image of a poultry leg back side is inputted. The non-detection of a front side implies that the side in question is a back side.

The object is additionally achieved by an arrangement for training at least one neural network for locating bony parts present in a poultry leg, comprising an optical camera adapted to record images of the front sides or back sides of the poultry legs in the optically visible wavelength range and configured to generate optical image data for each of the poultry legs; an X-ray source adapted to irradiate the back side or front side of the poultry legs with X-rays, and an X-ray imaging system adapted to record X-ray images on the side of the poultry legs that is remote from the X-ray source and configured to generate X-ray image data for each of the poultry legs; a display and input device configured to display the X-ray image data and/or to display hybrid image data and to input reference points which are to be defined and which serve to mark the positions of the bony parts; an overlay unit configured to overlay the optical image data with the X-ray image data and/or the reference points in order to generate the hybrid image data for each of the poultry legs; at least one neural network, and a learning cycle control unit which is configured and adapted to input the image data as input data and the reference points as target data as training data for the neural network, wherein the learning cycle control unit is adapted to repetitively adjust weights of the neural network on the basis of the difference between the target data and the output data generated by the neural network.

The arrangement according to the invention has the advantage that X-ray imaging is used only in the training or learning phase. Once the neural network has been trained by the method according to the invention, the location of the bony parts in the poultry legs can reliably be determined solely on the basis of optical images of the poultry legs. In the training phase, the optical image data and the X-ray image data are overlaid with one another. The hybrid image data thus represent an overlay image which contains the optical image of the intact poultry leg and the X-ray image. It is therefore possible, on the basis of the hybrid image, to identify the exact location and position of the bony parts in the poultry leg and relate them to the external view of the intact poultry leg. In this manner, a correlation between the location of the bony parts and the external form of the poultry leg is established and learned by the neural network.

A preferred further development of the invention is characterised in that the reference points comprise thigh reference points, lower leg reference points and knee cap reference points. The above-mentioned reference points provide sufficient accuracy for determining the location and position of the thigh and lower leg bones and of the knee cap. At the same time, the algorithmic complexity for determining these reference points is reduced to a necessary minimum.

According to a further preferred embodiment of the invention, the thigh reference points and the lower leg reference points are pairs of points which in each case denote the position of the bone end areas. On the basis of the pairs of points, the position and orientation of the mentioned bones in the poultry leg is defined sufficiently accurately. Particularly preferably, the pairs of points in each case lie at the head of the bone.

A further expedient embodiment of the invention is characterised in that the knee cap reference points form a cloud of points comprising at least one point, wherein the points of the cloud of points reference edge positions of the knee cap. A cloud of points with one point is generally sufficient for indicating the location of the knee cap. Alternatively, this one point is so chosen that it lies in the middle of the knee cap.

According to a further preferred embodiment of the invention, the cloud of points comprises at least an upper knee cap reference point and a lower knee cap reference point, wherein the upper and lower knee cap reference points are located in a knee cap edge area. By specifying the two mentioned reference points, it is possible to determine not only the position of the knee cap but also its size. Particularly preferably, the cloud of points comprises a third reference point in addition to the mentioned upper knee cap reference point and the lower knee cap reference point, so that the three reference points form a triangle, the area of which covers the knee cap as much as possible. The mentioned three reference points then preferably lie—as already mentioned—at the edge of the knee cap. Alternatively, it is possible that the cloud of points—as mentioned hereinbefore—comprises only one point, preferably only the upper knee cap reference point or a point which lies in the middle of the knee cap.

A further expedient embodiment of the invention is characterised in that the arrangement is configured to extract object-related image regions of the optical image data and the X-ray image data from the image background before the hybrid image data are generated. By means of the extraction, image regions that do not show the poultry leg, or the bony parts thereof, are masked. This prevents structures located in the background from being taken into account in the training of the neural network. Overall, the reliability and precision of the location of the bony parts is thus increased.

The object is further achieved by an apparatus for locating bony parts present in a poultry leg, comprising a conveying device adapted to convey the poultry legs in a conveying direction; a first optical imaging system configured to acquire digital images of the front sides or back sides of the poultry legs; a first neural network which is configured to locate the bony parts and has been trained by a method as disclosed herein; and an input unit adapted to sequentially provide the digital images as input data to the first neural network, wherein the first neural network is adapted to determine position data of the bony parts and to provide the position data, for display and/or transmission, to a downstream machine for processing the poultry legs on the basis of the determined position data.

The apparatus according to the invention is therefore free of X-ray imaging. The required outlay in terms of apparatus is thus reduced considerably compared to the apparatuses known from the prior art. In particular by dispensing with X-ray imaging, the risks associated with X-ray imaging are no longer present and the use of highly skilled personnel can be dispensed with. Moreover, expensive components of X-ray imaging are no longer required during operation and the required outlay in terms of maintenance is considerably less. The apparatus according to the invention is therefore considerably less expensive compared to the apparatuses known from the prior art. However, it is in no way inferior to X-ray-based apparatuses in terms of the precision of the location of the bony parts.

An expedient embodiment of the invention is characterised in that the reference points comprise thigh reference points, lower leg reference points and knee cap reference points. The above-mentioned reference points provide sufficient accuracy for determining the location and position of the thigh and lower leg bones and of the knee cap. At the same time, the algorithmic complexity for determining these reference points is reduced to a necessary minimum.

An expedient embodiment of the invention is characterised in that the thigh reference points and the lower leg reference points are pairs of points which in each case denote the position of the bone end areas. On the basis of the pairs of points, the position and orientation of the mentioned bones in the poultry leg is defined sufficiently accurately. Particularly preferably, the pairs of points in each case lie at the head of the bone. A cloud of points with one point is generally sufficient for indicating the location of the knee cap. Alternatively, this one point is so chosen that it lies in the middle of the knee cap.

According to a further preferred embodiment, the knee cap reference points form a cloud of points comprising at least one point, wherein the points of the cloud of points reference edge positions of the knee cap. A cloud of points with one point is generally sufficient for indicating the location of the knee cap. Alternatively, this one point is so chosen that it lies in the middle of the knee cap.

A further expedient embodiment of the invention is characterised in that the cloud of points comprises at least an upper knee cap reference point and a lower knee cap reference point, wherein the upper and lower knee cap reference points are located in a knee cap edge area. By specifying the two mentioned reference points, it is possible to determine not only the position of the knee cap but also its size. Particularly preferably, the cloud of points comprises a third reference point in addition to the mentioned upper knee cap reference point and the lower knee cap reference point, so that the three reference points form a triangle, the area of which covers the knee cap as much as possible. The mentioned three reference points then preferably lie—as already mentioned—at the edge of the knee cap.

A further expedient embodiment of the invention is characterised by a control unit of the downstream machine, which control unit is adapted to determine, from the position data provided, a cutting line path of the located bony parts, wherein the control unit is further configured, for processing the poultry legs, to move a knife, which is adapted to be controllably moved, of the downstream machine along this cutting line path in order to debone the poultry leg. In this manner, the poultry leg can be optimally deboned. Knowledge of the location of the bony parts allows an optimal cutting line path to be determined, so that the flesh is detached from the bony parts but contact of the knife of the downstream machine with the bony parts of the poultry leg is avoided at all events. At the same time, however, knowledge of the position of the bony parts allows the cutting line to be brought as close as possible to the bony parts in order to leave as little residual flesh as possible on the bony parts. The position of the incision, which is generally in the region of the knee cap, can thus also be determined exactly. The present invention thus allows poultry legs to be deboned fully automatically.

According to a further preferred embodiment of the invention, the apparatus further comprises a leg-side detection device which is configured to carry out a leg-side detection on the basis of the acquired digital images of the poultry legs before they are provided as input data to the first neural network, and to establish whether each particular digital image is of a right or a left poultry leg and, if the digital image does not match a specified leg side, to mirror the image data of the digital image in question at a virtual axis in order to convert the digital image of a right poultry leg into a virtual digital image of a left poultry leg and vice versa. Advantageously, it is thus sufficient to design the first neural network so that it detects only one leg type, namely either a left or a right poultry leg. As a result, both the complexity of the neural network is reduced and the required outlay in terms of training the neural network is reduced considerably, since it has to be trained with only one poultry leg type. If the neural network is designed for the processing of left poultry legs, for example, digital images of right poultry legs are first mirrored as described. As a result of the mirroring, the partial image of the poultry leg then appears as though it had been taken of a left poultry leg. In this manner, the image data both of right and of left poultry legs can be used to locate the bony parts in poultry legs by means of the neural network designed for the processing of left poultry legs. If the neural network is designed for the processing of right poultry legs, the procedure is correspondingly carried out the other way round, and the partial images of left poultry legs are mirrored as described before being processed by the neural network.

According to a further preferred embodiment of the invention, the leg-side detection comprises a second neural network which has been trained with images of poultry legs of the specified leg side. This has the advantage of very high detection accuracy. Preferably, the second neural network is trained in each case exclusively with images of left or right poultry legs. If the second neural network is designed for the detection of left poultry legs, for example, it indicates that no left leg has been detected when an image of a right poultry leg is inputted. The non-detection of a left poultry leg implies that the leg in question is a right leg.

A further expedient embodiment of the invention is characterised in that the apparatus further comprises a front-side and back-side detection device which is adapted to carry out a front-side and back-side detection before the digital images of the poultry legs are provided as input data to the first neural network and/or before the leg-side detection, and to establish whether each particular digital image shows the front side or the back side of the poultry leg and, if the digital image does not match a specified front side/back side, to cause a suspending receptacle of the conveying device, which suspending receptacle holds the poultry leg in question and is controllably pivotable about its vertical axis, to perform a 180° rotation, and to acquire a digital image of the side of the poultry leg facing the first optical imaging system by means of a second optical imaging system which is arranged downstream of the first optical imaging system relative to the conveying direction. This has the advantage that the poultry legs do not have to be pre-sorted in terms of their front side/back side orientation. Location of the bony parts can therefore take place fully automatically regardless of the orientation of the poultry legs. Preferably, the front side of the poultry legs is always chosen as the specified side because, owing to its larger proportion of flesh and the resulting curved surface, it provides better points of reference in the digital images for the location of the bony parts.

A preferred further development of the invention is distinguished in that the front-side and back-side detection device comprises a third neural network which has been trained with images of poultry legs of the specified front side/back side. This has the advantage of very high detection accuracy. Preferably, the third neural network is in each case trained exclusively with images of the front side or back side of poultry legs. If the third neural network is designed to detect poultry leg front sides, for example, it indicates that no front side has been detected when an image of a poultry leg back side is inputted. The non-detection of a front side implies that the side in question is a back side.

The object is also achieved by a non-volatile computer-readable storage medium comprising a program which comprises instructions for causing the computer to carry out the above-described method for locating bony parts present in a poultry leg.

BRIEF DESCRIPTION OF THE DRAWINGS

Further preferred and/or expedient features and embodiments of the invention will become apparent from the description. Particularly preferred embodiments will be explained in greater detail with reference to the accompanying drawing, in which.

DETAILED DESCRIPTION OF THE INVENTION

The methods according to the invention, the storage medium according to the invention and the apparatus according to the invention will be explained in greater detail in the following text.

Figure 1:
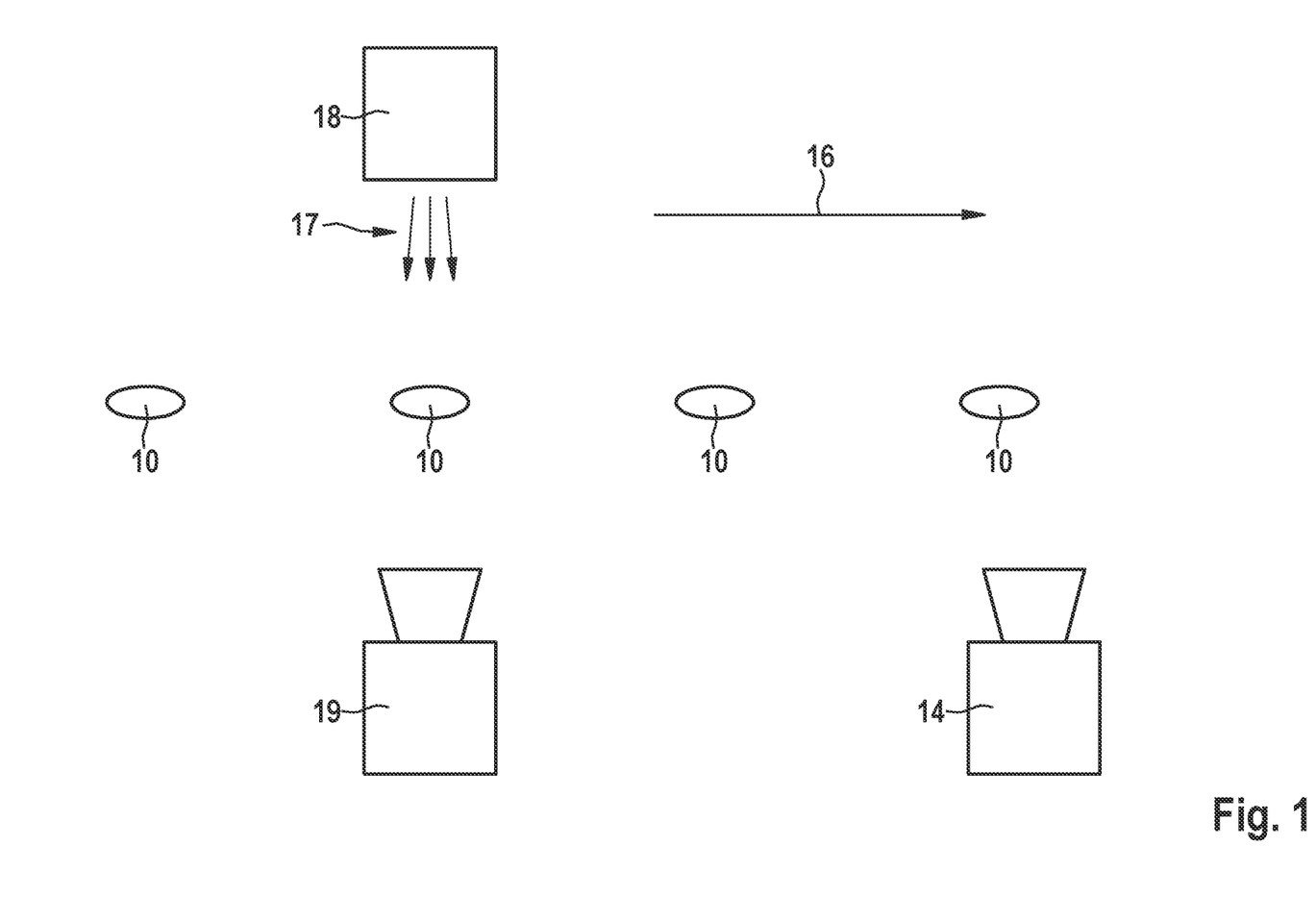
FIG. 1 is a plan view of the arrangement according to the invention for training at least one neural network for locating bony parts present in a poultry leg.
Figure 3:
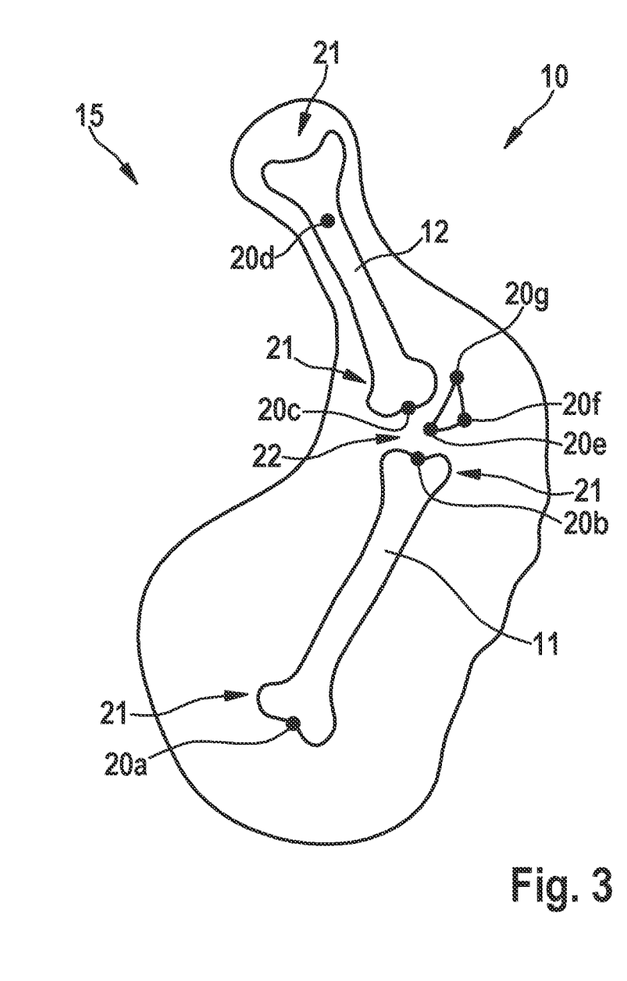
FIG. 3 is a diagrammatic view of a hybrid image based on the hybrid image data.

FIG. 1 is a plan view of the arrangement according to the invention for training at least one neural network for locating bony parts present in a poultry leg 10. These bony parts, as shown in FIG. 3, are in particular the thigh bone 11, the lower leg bone 12 and the knee cap. The following remarks serve both to explain the mentioned arrangement and to describe in greater detail the method according to the invention for training the mentioned neural network.

For training the neural network, it is first necessary to provide a plurality of poultry legs 10. The invention according to the arrangement comprises an optical camera 14 which is adapted to record images of the front sides or back sides of the poultry legs 10 in the optically visible wavelength range. The optical camera 14 is thus configured to generate optical image data for each of the poultry legs 10. Preferably, the poultry legs 10 are oriented with their front side towards the optical camera 14 so that only images of the poultry leg front side are recorded. However, it is also possible that the poultry legs 10 are oriented with their back side towards the optical camera 14. In this case, only images of the poultry leg back side are recorded.

The poultry legs 10 can be transported in a conveying direction 16 by means of, for example, a conveying device—not shown in the drawing. However, it is also possible that the poultry legs 10 are positioned in front of the optical camera 14 manually.

The invention according to the arrangement further comprises an X-ray source 18 which is adapted to irradiate the back side or front side of the poultry legs 10 with X-rays 17, and an X-ray imaging system 19, or X-ray imaging sensor, adapted to record X-ray images. The X-ray imaging system 19 is arranged on the side of the poultry legs 10 that is remote from the X-ray source 18 and is configured to generate X-ray image data. In this manner, X-ray image data for each of the poultry legs 10 are generated.

The optical image data and the X-ray image data that are obtained form the basis upon which the first neural network is trained. The optical image data and the X-ray image data are fed to an overlay unit—not shown in the drawing—which is adapted to overlay the optical image data of one of the poultry legs 10 with the X-ray image data of the same poultry leg 10 in order to generate hybrid image data for each of the poultry legs 10. The hybrid images 15 for each of the poultry legs 10 thus represent an overlay image obtained by superposition, in which the location of the bony parts, in particular of the thigh bone 11, the lower leg bone 12 and the knee cap, are visible together with the external form of the poultry leg 10. Preferably, the images are recorded by means of the optical camera 14 and the X-ray imaging system 19 in such a manner that the image sections of each poultry leg that are recorded are as congruent with one another as possible. Preferably, the overlaying is additionally adapted to establish such congruence of the image sections.

According to a further advantageous embodiment of the invention, the reference points 20 for marking the positions of the bony parts are first defined on the basis of the X-ray image data. They can be defined by an inspector, for example, or semi-automatically. The positions of the bony parts so determined are then overlaid with the optical image data and thus the hybrid image data for each of the poultry legs 10 are generated.

The method according to the invention and the apparatus for training the neural network further comprise displaying the hybrid image data by means of a display and input device—not shown in the drawing. On the basis of the displayed hybrid data, reference points 20 which serve to mark the position of the bony parts are then defined by an inspector, for example, or semi-automatically. The reference points 20 are inputted via the input device.

FIG. 3 shows by way of example a diagrammatic view of such a hybrid image 15 based on the hybrid image data.

The present invention further comprises a neural network—not shown in the drawing—and a learning cycle control unit. The learning cycle control unit is configured and adapted to input the optical image data and the reference points 20, preferably the reference points 20a, 20b, 20c, 20d, 20e, 20f, 20g, as training data for the neural network. The optical image data thus form the input for the neural network, while the reference points 20 in each case correspond to the output data of the neural network expected for the optical image data in question and thus form the target data.

For training the neural network, the learning cycle control unit is adapted to repetitively adjust the weights of the neural network on the basis of the difference between the target data and the output data generated by the neural network. The neural network is preferably a multi-layer neural network with a corresponding number of hidden layers. Preferably, the weights are adjusted during training by means of the stochastic gradient descent method. There is used as the loss function, for example, the mean squared error from the difference between the target data and the output data generated by the neural network.

The structure of such neural networks and the adjustment of the weights of the neural network on the basis of the error between the desired output data and the target data are well known, so that further comments will not be made thereon at this point.

Preferably, the reference points 20 in each case comprise two points for marking the thigh 11 and the lower leg 12 and three points for marking the knee cap. Thus, the thigh reference points 20a, 20b mark the location of the thigh bone 11, the lower leg reference points 20c, 20d mark the position of the lower leg bone 12, and the knee cap reference points 20e, 20f, 20g mark the location of the knee cap. Of course, the present invention is not limited to the mentioned number of reference points 20. Rather, it is also possible to specify more reference points 20.

Further preferably, the thigh reference points 20a, 20b and the lower leg reference points 20c, 20d in each case form pairs of points. These pairs of points preferably mark the position of the bone end areas 21. The bone end areas 21 in each case refer to the area of a bone in which the joint heads are located. Preferably, the knee cap reference points 20e, 20f, 20g form a cloud of points 22, the points of which reference edge positions of the knee cap. The cloud of points 22 comprises at least one of the knee cap reference points 20e, 20f, 20g. Preferably, however, the cloud of points 22 comprises the three knee cap reference points 20e, 20f, 20g shown in FIG. 3, which reference the edge of the knee cap.

According to a further preferred embodiment of the invention, the cloud of points 22 at least comprises two of the reference points 20e, 20g, namely a lower knee cap reference point and an upper knee cap reference point.

Preferably, the overlay unit is adapted to extract object-related image regions of the optical image data and the X-ray image data from the image background before the hybrid image data are generated. In other words, image regions that represent only the background are masked in the data in question.

The present invention relates also to a non-volatile computer-readable storage medium having a program which comprises instructions for causing the computer to carry out the above-described method for training the neural network. All the usual storage types are suitable as the storage medium, for example CD-ROMs, DVDs, memory sticks, fixed disks or cloud storage services.

Figure 2:
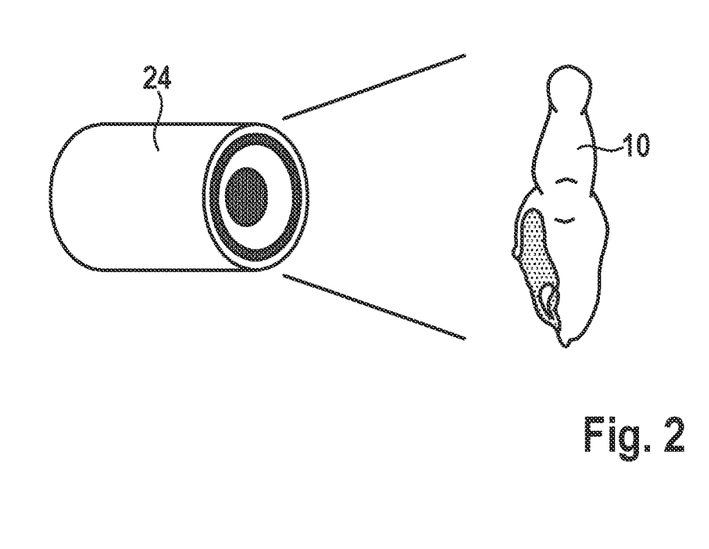
FIG. 2 is a diagrammatic view of a first optical imaging system and of a poultry leg located in front of the first optical imaging system.

The present invention also comprises an apparatus and a method for locating bony parts present in the poultry leg 10. The apparatus according to the invention and the method according to the invention will first be explained in greater detail in the following text with reference to FIG. 4. The apparatus comprises a conveying device 23 which is configured to convey the poultry legs 10 in a conveying direction 16. By means of a first optical imaging system 24, which is shown in diagrammatic form in FIG. 2, digital images 25 of the front sides or back sides of the poultry legs 10 are acquired. It has been found to be particularly advantageous always to acquire the front sides of the poultry legs 10. However, it is in principle possible always to acquire the back sides of the poultry legs 10. The apparatus further comprises a first neural network—not shown in the drawing—which is configured to locate the bony parts in the poultry leg 10. The first neural network has previously been trained by means of the method according to the invention for training a neural network for locating bony parts present in a poultry leg.

Figure 4:
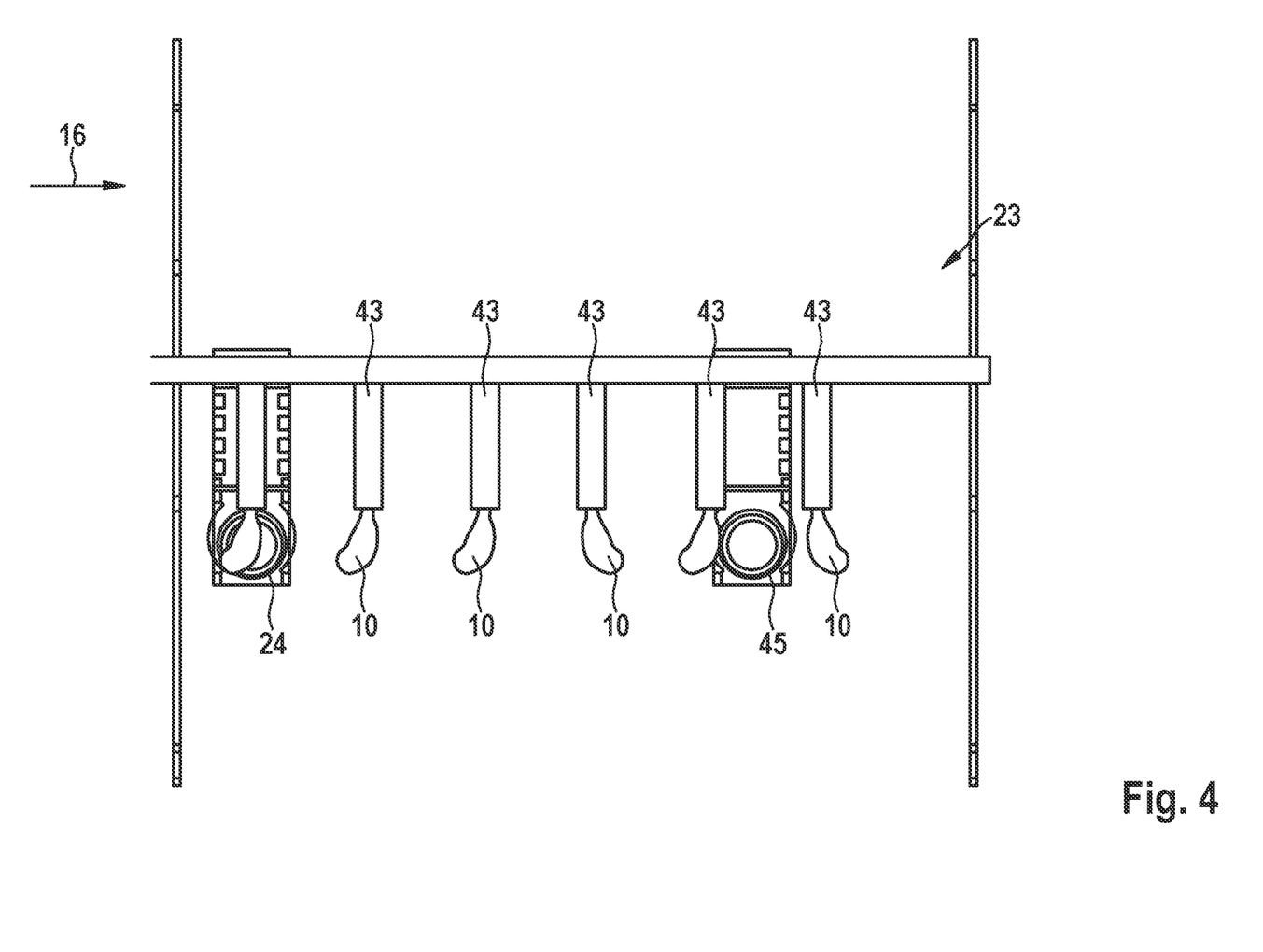
FIG. 4 is a diagrammatic view of the apparatus according to the invention for locating bony parts.

The apparatus according to the invention further comprises an input unit—not shown in the drawing—which is adapted sequentially to provide the digital images as input data to the first neural network. In other words, the first neural network preferably receives the digital images of the front sides of the poultry legs 10 as input data. The correspondingly trained first neural network is adapted to determine position data 31 of the bony parts on the basis of these input data and to provide these determined position data 31, for display and/or transmission, to a downstream machine 26 for processing the poultry legs 10 on the basis of the determined position data 31.

Figure 5:
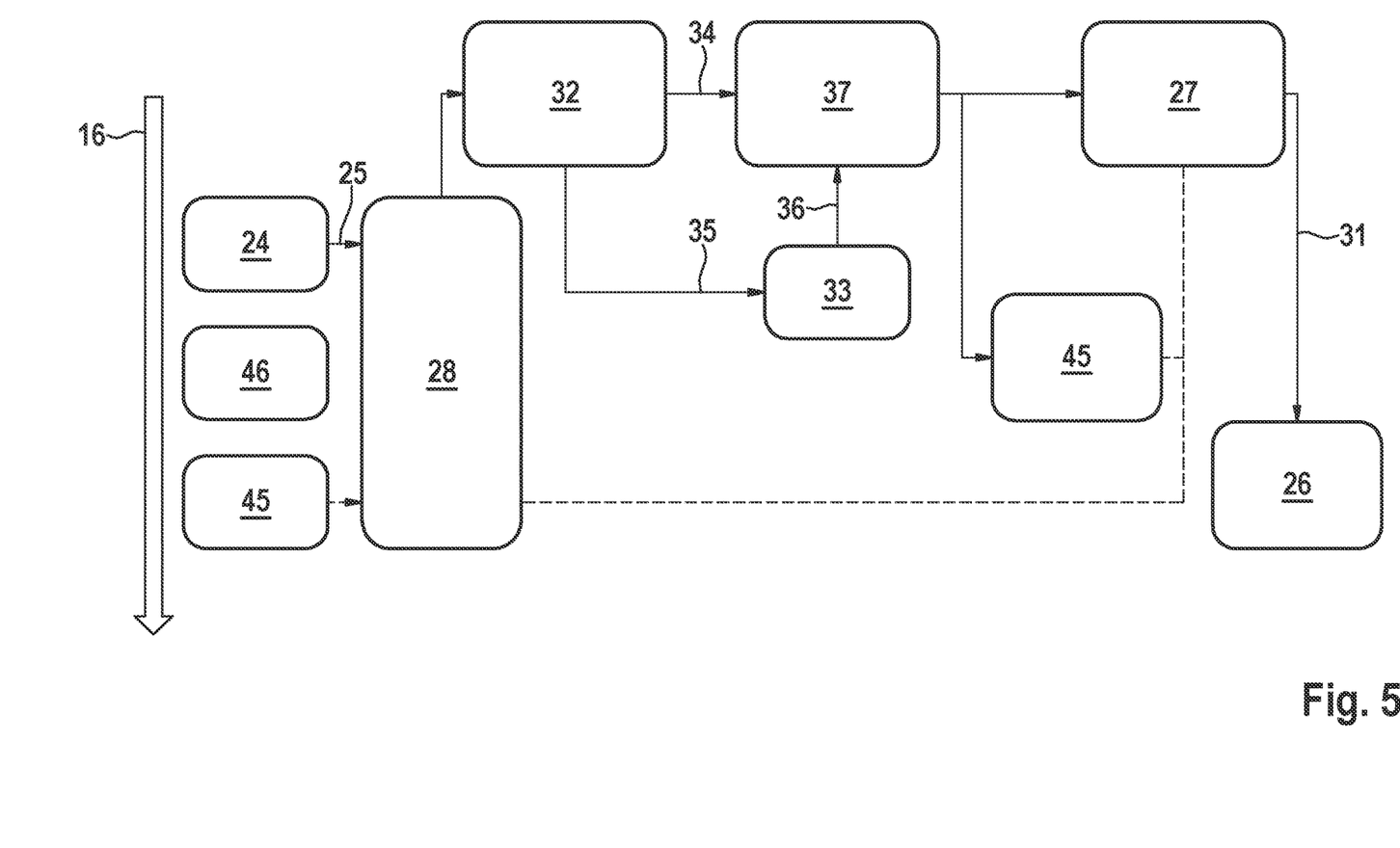
FIG. 5 is a block diagram.

The steps of the method will become further apparent from the block diagram according to FIG. 5. The poultry legs 10 conveyed in the conveying direction 16 by means of the conveying device 23 pass the first optical imaging system 24, by means of which digital images 25 of the front sides or back sides of the poultry legs 10 are acquired at given points in time. The digital images 25 are optionally subjected to pre-processing 28 and then their orientation is checked. As has been stated, the pre-processing 28 of the digital images 25 and the execution of steps 29, 30 are purely optional. Further details of the above-mentioned steps will be discussed hereinbelow. In principle, it is thus possible to sequentially provide the digital images 25 as input data for the first neural network in step 27 without further pre-processing. As described above, the position data 31 are then determined in step 27 by means of the first neural network. Further preferably, the poultry leg 10 is illuminated, preferably by means of flashlight, at least at the time of recording of the optical image data.

The neural network can be of various forms. In principle, all multi-layer networks come into consideration. A network structure with 29 layers has been found to be particularly advantageous in terms of detection accuracy while at the same time having an acceptable algorithmic complexity. Of these 29 layers, preferably sixteen are two-dimensional convolutional layers. Further preferably, the convolutional layers are divided into four blocks, each of which is followed by a max pooling layer and a dropout layer. Advantageously, with the exception of the last layer, in which a sigmoid function is used, all the other layers are activated by means of a rectifier function.

The input layer of the first neural network preferably forms an input layer which is adapted to process the digital images with a resolution of preferably 300×300 pixels. The output layer of the first neural network preferably comprises fourteen nodes, which each represent the x- and y-coordinates of the seven reference points 20. Further preferably, the first neural network is adapted to carry out all calculations using floating-point arithmetic. In particular, the calculations are carried out by means of floating-point numbers, preferably of the "float" type, with a resolution of 16 or 32 bits. Further preferably, the first neural network is configured with a plurality of processors for parallel calculation.

Preferably, the reference points 20 in each case comprise two points for marking the thigh 11 and the lower leg 12 and three points for marking the knee cap. Thus, the thigh reference points 20a, 20b mark the location of the thigh bone 11, the lower leg reference points 20c, 20d mark the position of the lower leg bone 12, and the knee cap reference points 20e, 20f, 20g mark the location of the knee cap. Of course, the present invention is not limited to the mentioned number of reference points 20. Rather, it is also possible to specify more reference points 20.

Further preferably, the thigh reference points 20a, 20b and the lower leg reference points 20c, 20d in each case form pairs of points. These pairs of points preferably mark the position of the bone end areas 21. Preferably, the knee cap reference points 20e, 20f, 20g form a cloud of points 22, the points of which reference edge positions of the knee cap. The cloud of points 22 comprises at least one of the knee cap reference points 20e, 20f, 20g. Preferably, however, the cloud of points 22 comprises the three knee cap reference points 20e, 20f, 20g shown in FIG. 3, which reference the edge of the knee cap. Alternatively, it is possible that the cloud of points 22—as mentioned hereinbefore—comprises only one point, preferably only the upper knee cap reference point 20g or a point—not shown in the drawing—which lies in the middle of the knee cap.

According to a further preferred embodiment of the invention, the cloud of points 22 at least comprises two of the reference points 20e, 20g, namely a lower knee cap reference point and an upper knee cap reference point.

The method according to the invention preferably also comprises determining, from the position data provided, a cutting line path by means of a control unit—not shown in the drawing—of the downstream machine 26. By means of the control unit of the downstream machine 26, a knife, which is adapted to be controllably moved, is moved along this cutting line path in order to debone the poultry leg 10. Knowledge of the positions of the bony parts in the poultry leg 10 allows an optimal cutting line path to be determined in order to leave as little residual flesh as possible on the bones in question while at the same time preventing the knife from cutting into the bony parts themselves.

Figure 6:
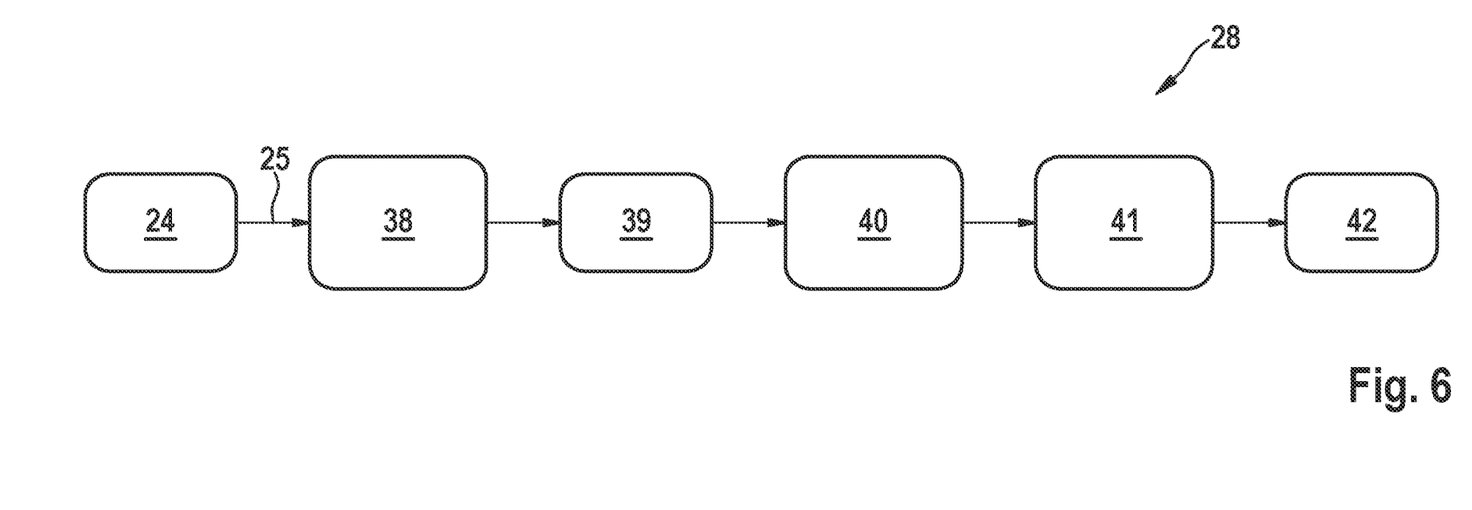
FIG. 6 is a flow diagram of the pre-processing.
Figure 7:
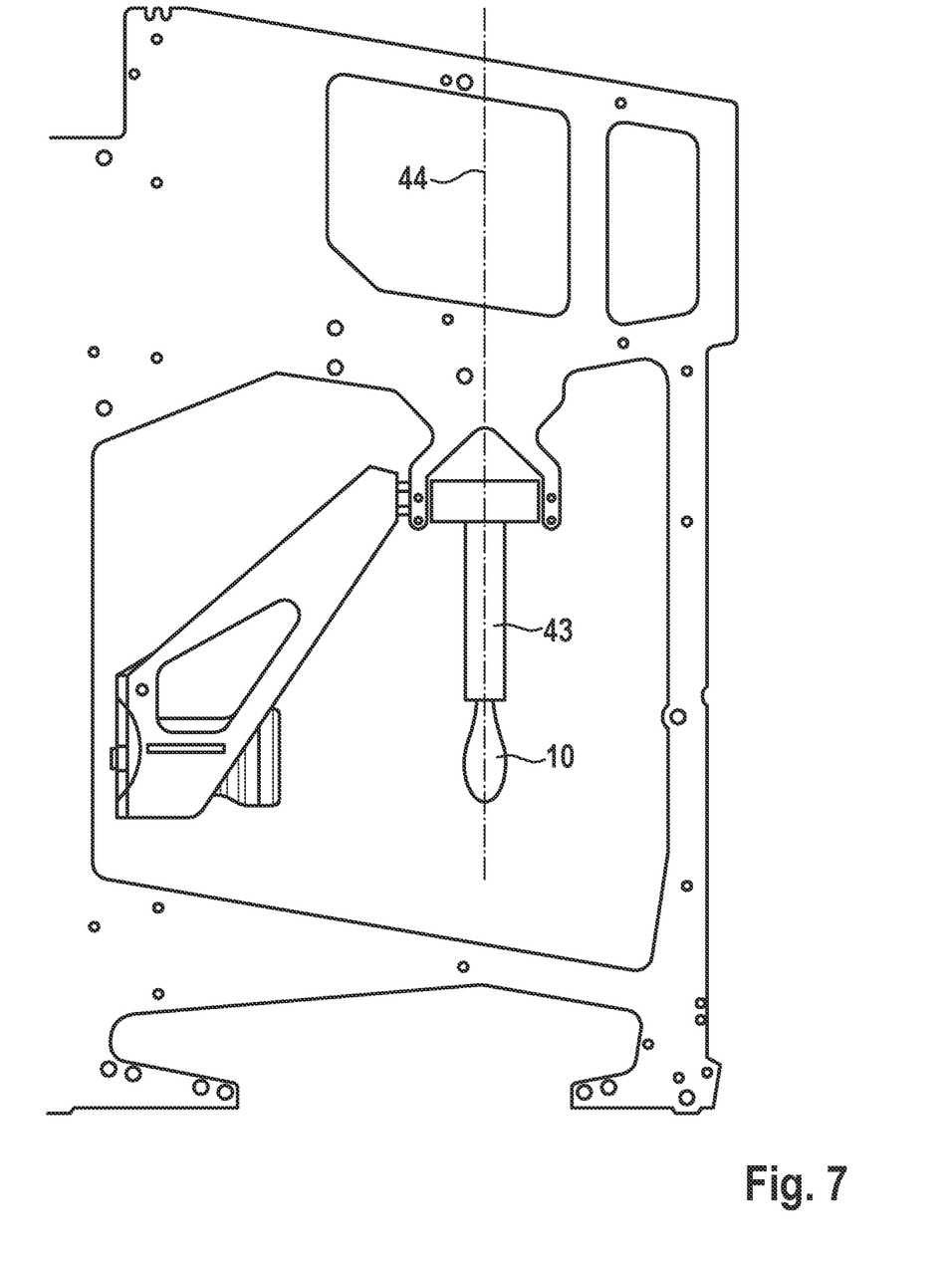
FIG. 7 is a side view of the apparatus shown in FIG. 4.

FIG. 6 shows a flow diagram for the pre-processing 28 mentioned hereinbefore. Step 28 preferably consists in first subjecting the digital images 25 to lens correction 38. Background masking 39 is then advantageously carried out in order to extract the image region in which the poultry leg 10 is visible. Further preferably, in a next downsampling step 40, the resolution of the digital image is reduced, for example to a resolution of 300×300 or preferably 100×100 or 128×128 pixels. However, the present invention is not limited to the mentioned resolutions. Rather, any other resolution reduction can be applied. A colour conversion 41, for example to a BGR or grayscale image, is then optionally carried out. In order to adjust the digital image 25 for inputting to the first neural network, conversion to floating-point numbers is then preferably carried out by means of a floating-point conversion step 42.

Further preferably, the acquired digital images 25 of the poultry legs 10 are fed to a leg-side detection device 32 shown in FIG. 5 before they are provided as input data to the first neural network. The leg-side detection device is adapted to carry out a leg-side detection and to establish whether each particular digital image 25 is of a right or a left poultry leg. In order to keep the training outlay and the algorithmic complexity of the first neural network as low as possible, it is preferably trained for only one type of poultry leg 10, namely either left or right poultry legs 10. In order to ensure reliable detection of the bony parts by means of the first neural network, it is therefore necessary to prepare the digital images 25 of the "correct" poultry legs 10, that is to say, for example, always of left poultry legs if the neural network has previously been trained with left poultry legs 10.

Advantageously, the method according to the invention and the apparatus are adapted to automatically determine whether the recorded digital image 25 is of a right poultry leg 10 or of a left poultry leg 10. If the digital image 25 does not match a specified leg side, the leg-side detection device 32 is adapted to mirror the image data of the digital image 25 in question at a virtual axis in order to convert the digital image 25 of a right poultry leg 10 into a virtual digital image 25 of a left poultry leg 10 and vice versa.

If the first neural network has been trained with left poultry legs 10, for example, the digital image 25 is not changed by means of the leg-side detection device 32 if it detects that the poultry leg 10 in question is a left poultry leg. The digital image 25 is then transmitted via the signal flow arrow 34, as shown in FIG. 5. Otherwise, the digital image 25 is guided along the signal flow arrow 35 in order to be mirrored in step 33, as described above. The digital image 25 thus passes along the signal flow arrow 34 or 36 either directly as input to the first neural network for locating the bony parts in step 27 or after image mirroring.

Preferably, the leg-side detection is carried out by means of a second neural network which has been trained with images of poultry legs 10 of the specified leg side, that is to say with left legs, for example. The leg-side detection device 32 thus preferably comprises the second neural network. If a digital image 25 that corresponds to the specified leg side is detected, the digital image 25—as described above—remains unchanged. If the second neural network does not detect the specified leg side, the digital image 25 is mirrored.

Figure 8:
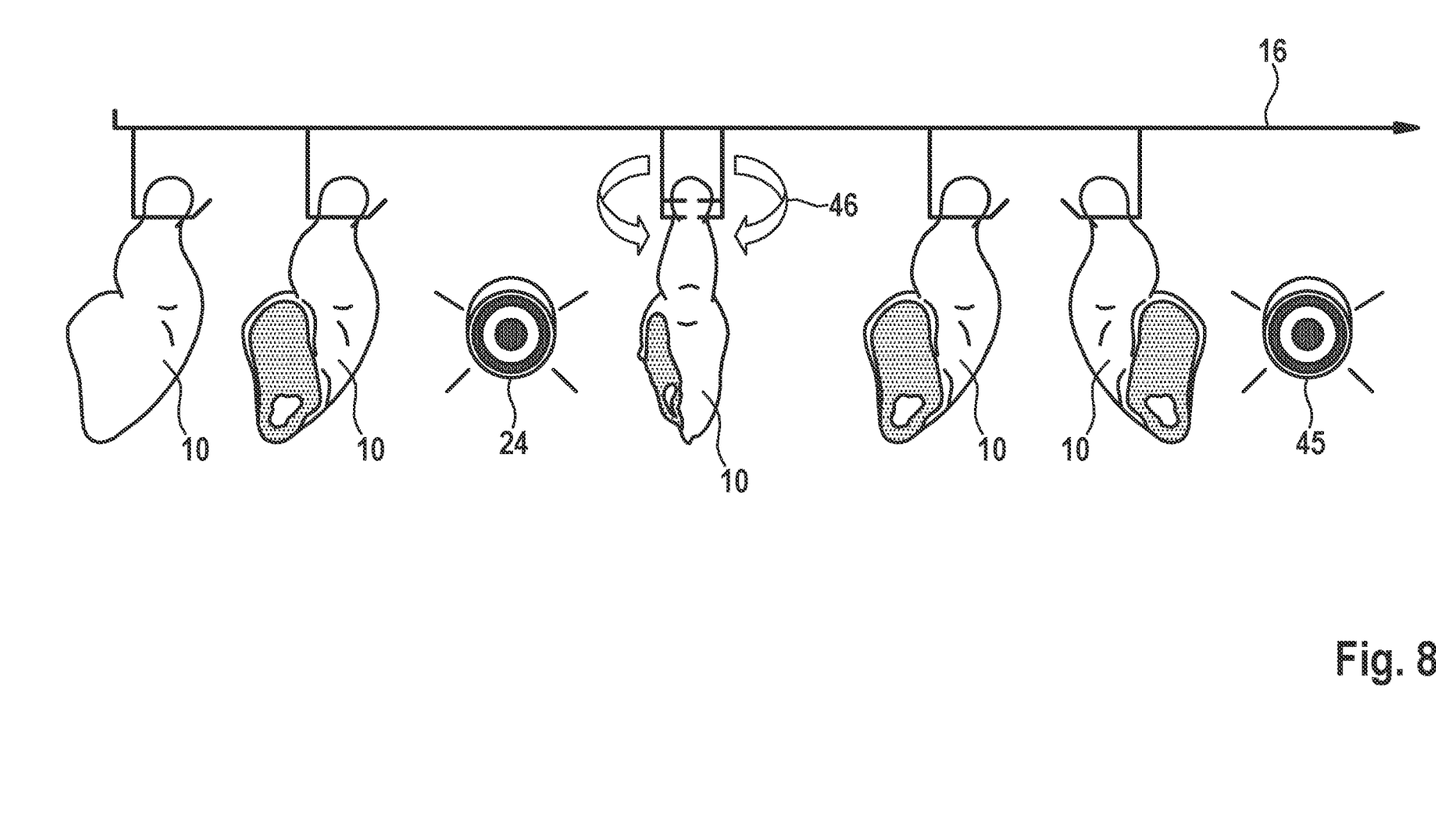
FIG. 8 is a diagrammatic representation of the front-side and back-side detection device.

Further preferably, the digital images 25 of the poultry legs 10 are fed to a front-side and back-side detection device 37 before they are provided as input data to the first neural network and/or before the leg-side detection. The front-side and back-side detection device 37 is configured to establish whether each particular digital image 25 shows the front side or the back side of the poultry leg 10. If the digital image 25 does not match a specified front side/back side, the front-side and back-side detection device is adapted to cause the poultry leg 10 to be rotated such that it is oriented with the respective other side facing the first optical imaging system 24. This operation is illustrated diagrammatically in FIG. 8.

The conveying device 16 comprises for this purpose a plurality of suspending receptacles 43 which are each configured and adapted to receive one of the poultry legs 10. The suspending receptacles 43 are each configured to be controllably pivotable about their vertical axis 44. In the side view of the conveying device 16 in FIG. 8, such a suspending receptacle 43 is shown in detail. If it has been established by means of the front-side and back-side detection device 37 that the poultry leg 10 in question was not oriented with the desired side facing the first optical imaging system 24, the front-side and back-side detection device causes the respective suspending receiver 43 of the conveying device 16 to execute a 180° rotation in step 46. Then, by means of a second optical imaging system 45 which is arranged downstream of the first optical imaging system 24 relative to the conveying direction 16, the poultry leg side facing the second optical imaging system 45 is acquired.

Preferably, the front-side and back-side detection is carried out by means of a third neural network which has been trained with images of poultry legs of the specified front side/back side. The front-side and back-side detection device consequently preferably comprises the third neural network.

The object is achieved by a non-volatile computer-readable storage medium comprising a program which comprises instructions for causing the computer to carry out the method for locating bony parts present in the poultry leg 10.

According to an advantageous embodiment of the invention, the lenses of the optical camera 14 and of the first and second optical imaging systems 24, 25 comprise polarisation filters. These are configured to reduce possible reflections caused, for example, by moist or wet surfaces of the poultry legs 10.

The invention claimed is:

1. A method for training at least one neural network for locating bony parts present in a poultry leg, comprising the following steps:
providing a plurality of poultry legs;
recording images of front sides or back sides of the poultry legs in an optically visible wavelength range by an optical camera in order to generate optical image data for each of the poultry legs;
irradiating the back side or front side of the poultry legs with X-rays of an X-ray source and recording X-ray images on the side of the poultry legs that is remote from the X-ray source by an X-ray imaging system in order to generate X-ray image data for each of the poultry legs;
defining reference points for marking positions of the bony parts on a basis of the X-ray image data;
overlaying the optical image data with the positions of the X-ray image data in order to generate hybrid image data for each of the poultry legs;
inputting the optical image data of the optical camera as input data and the reference points as target data as training data for the neural network; and
repetitively adjusting weights of the neural network on a basis of a difference between the target data and the output data generated by the neural network.

2. The method according to claim 1, wherein the reference points comprise thigh reference points, lower leg reference points and knee cap reference points.

3. The method according to claim 2, wherein the thigh reference points and the lower leg reference points are pairs of points which in each case denote a position of bone end areas.

4. The method according to claim 2, wherein the knee cap reference points form a cloud of points comprising at least one point, wherein the points of the cloud of points reference edge positions of the knee cap.

5. The method according to claim 4, wherein the cloud of points comprises at least an upper knee cap reference point and a lower knee cap reference point, wherein the upper and lower knee cap reference points are located in a knee cap edge area.

6. The method according to claim 1, wherein object-related image regions of the optical image data and the X-ray image data are extracted from an image background before the hybrid image data are generated.

7. A non-volatile computer-readable storage medium comprising a program which comprises instructions for causing the computer to carry out the method according to claim 1.

8. A method for locating bony parts present in poultry legs, comprising the steps:
conveying the poultry legs in a conveying direction by means of a conveying device;
acquiring digital images of front sides or back sides of the poultry legs by first optical imaging system for each of the poultry legs conveyed past the first imaging system;
sequentially providing the digital images as input data to a first neural network configured for locating the bony parts, wherein the first neural network for locating the bony parts has been trained by a method according to claim 1;
determining position data of the bony parts by the first neural network; and
providing the position data, for display and/or transmission, to a downstream machine for processing the poultry legs on the basis of the determined position data.

9. The method according to claim 8, wherein the reference points comprise thigh reference points, lower leg reference points and knee cap reference points.

10. The method according to claim 9, wherein the thigh reference points and the lower leg reference points are pairs of points which in each case denote a position of bone end areas.

11. The method according to claim 9, wherein the knee cap reference points form a cloud of points comprising at least one point, wherein the points of the cloud of points reference edge positions of the knee cap.

12. The method according to claim 11, wherein the cloud of points comprises at least an upper knee cap reference point and a lower knee cap reference point, wherein the upper and lower knee cap reference points are located in a knee cap edge area.

13. The method according to claim 8, further comprising determining, from the position data provided, a cutting line path by a control unit of the downstream machine, and moving a knife, which is adapted to be controllably moved, of the downstream machine by the control unit along this cutting line path in order to debone the poultry leg.

14. The method according to claim 8, wherein the acquired digital images of the poultry legs, before the acquired digital images are provided as input data to the first neural network, are fed to a leg-side detection device which is adapted to carry out a leg-side detection and to establish whether each particular digital image is of a right or a left poultry leg and, if the digital image does not match a specified leg side, to mirror the image data of the digital image in question at a virtual axis in order to convert the digital image of a right poultry leg into a virtual digital image of a left poultry leg and vice versa.

15. The method according to claim 14, wherein the leg-side detection is carried out by a second neural network which has been trained with images of poultry legs of the specified leg side.

16. The method according to claim 14, wherein the digital images of the poultry legs, before the digital images are provided as input data to the first neural network and/or before the leg-side detection, are fed to a front-side and back-side detection device which is adapted to carry out a front-side and back-side detection and to establish whether each particular digital image shows the front side or the back side of the poultry leg and, if the digital image does not match a specified front side/back side, to cause a suspending receptacle of the conveying device, which suspending receptacle holds the poultry leg in question and is controllably pivotable about its vertical axis, to perform a 180° rotation, and to acquire a digital image of the side of the poultry leg facing the first optical imaging system by a second optical imaging system which is arranged downstream of the first optical imaging system relative to the conveying direction.

17. The method according to claim 16, wherein the front-side and back-side detection is carried out by a third neural network which has been trained with images of poultry legs of the specified front side/back side.

18. A non-volatile computer-readable storage medium comprising a program which comprises instructions for causing the computer to carry out the method according to claim 8.

19. An Apparatus for locating bony parts present in a poultry leg, comprising:
a conveying device adapted to convey the poultry legs in a conveying direction;
a first optical imaging system configured to acquire digital images of front sides or back sides of the poultry legs;
a first neural network which is configured to locate the bony parts and has been trained by a method according to claim 1; and
an input unit adapted to sequentially provide the digital images as input data to the first neural network, wherein the first neural network is adapted to determine position data of the bony parts and to provide the position data, for display and/or transmission, to a downstream machine for processing the poultry legs on the basis of the determined position data.

20. The Apparatus according to claim 19, wherein the reference points comprise thigh reference points, lower leg reference points and knee cap reference points.

21. The Apparatus according to claim 20, wherein the thigh reference points and the lower leg reference points are pairs of points which in each case denote a position of bone end areas.

22. The Apparatus according to claim 20, wherein the knee cap reference points form a cloud of points comprising at least one point, wherein the points of the cloud of points reference edge positions of the knee cap.

23. The Apparatus according to claim 20, wherein the cloud of points comprises at least an upper knee cap reference point and a lower knee cap reference point, wherein the upper and lower knee cap reference points are located in a knee cap end area.

24. The Apparatus according to claim 19, further comprising a control unit of the downstream machine, which control unit is adapted to determine, from the position data provided, a cutting line path of the located bony parts, wherein the control unit is further configured, for processing the poultry legs, to move a knife, which is adapted to be controllably moved, of the downstream machine along this cutting line path in order to debone the poultry leg.

25. The Apparatus according to claim 19, further comprising a leg-side detection device which is configured to carry out a leg-side detection on a basis of the acquired digital images of the poultry legs before the acquired digital images are provided as input data to the first neural network, and to establish whether each particular digital image is of a right or a left poultry leg and, if the digital image does not match a specified leg side, to mirror the image data of the digital image in question at a virtual axis in order to convert the digital image of a right poultry leg into a virtual digital image of a left poultry leg and vice versa.

26. The Apparatus according to claim 25, wherein the leg-side detection comprises a second neural network which has been trained with images of poultry legs of the specified leg side.

27. The Apparatus according to claim 25, further comprising a front-side and back-side detection device which is adapted to carry out a front-side and back-side detection before the digital images of the poultry legs are provided as input data to the first neural network and/or before the leg-side detection, and to establish whether each particular digital image shows the front side or the back side of the poultry leg and, if the digital image does not match a specified front side/back side, to cause a suspending receptacle of the conveying device, which suspending receptacle holds the poultry leg in question and is controllably pivotable about its vertical axis, to perform a 180° rotation, and to acquire a digital image of the side of the poultry leg facing the first optical imaging system by a second optical imaging system which is arranged downstream of the first optical imaging system relative to the conveying direction.

28. The Apparatus according to claim 27, wherein the front-side and back-side detection device comprises a third neural network which has been trained with images of poultry legs of the specified front side/back side.

29. An arrangement for training at least one neural network for locating bony parts present in a poultry leg, comprising:
a plurality of poultry legs;
an optical camera adapted to record images of front sides or back sides of the poultry legs in the optically visible wavelength range and configured to generate optical image data for each of the poultry legs;
an X-ray source adapted to irradiate the back side or front side of the poultry legs with X-rays, and an X-ray imaging system adapted to record X-ray images on the side of the poultry legs that is remote from the X-ray source and configured to generate X-ray image data for each of the poultry legs;

a display and input device configured to display the X-ray image data and/or to display hybrid image data and to input reference points which are to be defined and which serve to mark positions of the bony parts;

an overlay unit configured to overlay the optical image data with the X-ray image data and/or the reference points in order to generate the hybrid image data for each of the poultry legs;

at least one neural network; and a learning cycle control unit which is configured and adapted to input the optical image data as input data and the reference points as target data as training data for the neural network, wherein the learning cycle control unit is adapted to repetitively adjust weights of the neural network on a basis of a difference between the target data and the output data generated by the neural network.

30. The arrangement according to claim 29, wherein the reference points comprise thigh reference points, lower leg reference points and knee cap reference points.

31. The arrangement according to claim 30, wherein the thigh reference points and the lower leg reference points are pairs of points which in each case denote a position of bone end areas.

32. The arrangement according to claim 30, wherein the knee cap reference points form a cloud of points comprising at least one point, wherein the points of the cloud of points reference edge positions of the knee cap.

33. The arrangement according to claim 32, wherein the cloud of points comprises at least an upper knee cap reference point and a lower knee cap reference point, wherein the upper and lower knee cap reference points are located in a knee cap edge area.

34. The arrangement according to claim 29, wherein the overlay unit is adapted to extract object-related image regions of the optical image data and the X-ray image data from an image background before the hybrid image data are generated.

* * * * *